United States Patent
Creamer et al.

(10) Patent No.: US 7,336,774 B2
(45) Date of Patent: *Feb. 26, 2008

(54) VOTE PROCESSING IN A PUBLIC SWITCHED TELEPHONE NETWORK

(75) Inventors: Thomas E. Creamer, Boca Raton, FL (US); Peeyush Jaiswal, Boca Raton, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/852,829

(22) Filed: May 25, 2004

(65) Prior Publication Data

US 2005/0265527 A1 Dec. 1, 2005

(51) Int. Cl.
*H04M 11/00* (2006.01)
(52) U.S. Cl. ............................ 379/92.02; 379/92.02; 379/207.02; 379/221.08
(58) Field of Classification Search ............. 379/92.02, 379/92.03, 92.01, 207.02, 207.13, 207.15, 379/221.08, 221.09, 221.1, 221.12, 88.18, 379/88.19, 92.04
See application file for complete search history.

(56) References Cited

U.S. PATENT DOCUMENTS

| | | | | |
|---|---|---|---|---|
| 5,619,557 A | * | 4/1997 | Van Berkum | 379/265.02 |
| 5,838,774 A | * | 11/1998 | Weisser, Jr. | 379/92.02 |
| 6,324,266 B1 | * | 11/2001 | Mannings | 379/92.04 |
| 6,693,897 B1 | * | 2/2004 | Huang | 370/352 |
| 2002/0114324 A1 | * | 8/2002 | Low et al. | 370/352 |

* cited by examiner

*Primary Examiner*—Melur Ramakrishnaiah
(74) *Attorney, Agent, or Firm*—Richard A. Tomlin, Esq.; Steven M. Greenberg, Esq.; Carey Rodriguez Greenberg & Paul LLP

(57) ABSTRACT

A method, system and apparatus for vote processing in concert with a PSTN. In accordance with the present invention, a method for vote processing in a PSTN can include receiving a vote from a calling party over the PSTN. Caller information for the calling party can be retrieved from the PSTN. Subsequently, the vote can be validated based upon the caller information. Finally, the vote can be processed based upon the validation. For instance, the vote can be tallied if the calling party is validated as not having previously voted. In contrast, the vote can be rejected if the calling party is determined to have previously voted.

19 Claims, 3 Drawing Sheets

VOTE PROCESSING IN A PUBLIC SWITCHED TELEPHONE NETWORK

BACKGROUND OF THE INVENTION

1. Statement of the Technical Field

The present invention relates to telephonic polling and voting, and more particularly to automatic processing of dial-in votes through a public switched telephone network (PSTN).

2. Description of the Related Art

The intelligent network of today bears little semblance to the PSTN of old. In fact, the term "intelligence" has little to do with the operation of the conventional PSTN. Rather, the conventional PSTN of old incorporates a massive complex of switching matrices and transport trunks that, through the electronic equivalent of "brute force", forge the interconnections necessary to call completion. More particularly, for decades for every call processed the PSTN relied upon each successive switch to route a voice signal to the next. Still, the modern volume of calls processed within the conventional PSTN demands a faster, more streamlined approach to call routing.

To overcome the elements of the brute force aspect of the conventional PSTN, physically separate signaling networks have been grafted upon the transport and switching PSTN elements to oversee call set-up and billing. These "out-of-band" adjuncts speed routing data and commands directly to the switches involved, establishing all the necessary links prior to the actual transmission of a call. Consequently, with "out-of-band" signaling the PSTN has become "conscious" of the operations it is to perform prior to their execution. As a result, the PSTN has become a more flexible beast, capable even of substantial logic.

The development of the "out-of-band" protocol, Signaling System 7 (SS7), has led to the widespread deployment of intelligent network technology. In SS7, signaling links transmit routing packets between switches. Consequently, specialized SS7 Signaling Transfer Points (STPs) appeared to shepherd routing messages from local switches onto a high-capacity packet switches for distribution to other switches, STPs and call-related databases, such as the Line Information Database (LIDB), the Local Number Portability (LNP) database, the Toll Free Calling database and other databases containing additional call routing instructions. And, so, the agility of high-speed computer networking began exerting control over the raw power of the PSTN.

The marriage of convenience between SS7 and the PSTN soon produced the Advanced Intelligent Network (AIN)—an architecture where centralized databases control call processing. Logic ported via STPs to select switches now have become widely distributed throughout the network. AIN-capable switches also have begun to function as interactive signaling-platforms. Equipped with resident software triggers, AIN capable switches now can halt a call in progress long enough to query Service Control Points (SCPs)—databases containing service logic and subscriber information—which can provide instruction as to how to route, monitor, or terminate the call. The PSTN of today now effectively includes long-term memory as well as intelligence. Accordingly, the modern local exchange carrier holds the means to deploy such advanced telecommunications features such as telephone number portability, wireless roaming, call waiting and a host of other subscriber options.

The LIDB is a database configured for coupling to the PSTN through an SCP. The LIDB typically includes amorphous records arranged to store information regarding telephone callers, such as the name of the caller, the address of the caller, billing information for the caller, and the like. By storing invariable information regarding the caller, such as the name, address and billing method, many intelligent telephonic services can be provided over the PSTN through a simple query to the LIDB. In this regard, several local exchange carriers have deployed independent LIDB access services to facilitate the deployment of intelligent telephonic services which can exploit the invariant information stored within the LIDB.

Despite the wealth of information associated with a telephone caller stored in the LIDB, the LIDB seems to remain an untapped resource suitable only for advanced telephony billing applications. Accordingly, many conventional inconveniences remain prevalent in the world of the call center. For instance, vote processing and poll processing systems have become prevalent among the consuming public. It is not uncommon for news programs to invite viewers to "vote" their opinion regarding a news item by dialing into a call center to place a vote by striking pre-specified keys (or audibly specifying a vote). Similarly, popular media entertainment programs often invite the viewing audience to transmit a "dial-in" vote for a contestant to win a prize. Votes are tallied in these circumstances according to the sheer number of votes received without regard to the identity of the caller.

For some survey and polling applications, it would be preferable to associate a vote with a person. In this regard, duplicate votes are possible where a mere counter tracks the progress of a vote or poll. In contrast, where an identity is associated with a vote, no duplication is possible. Nevertheless, in the modern call center maintaining an internal database of all possible callers so as to be able to identify a caller based upon the caller ID telephone number of the caller can be unwieldy and impractical. Moreover, callers often can block the identification of a call which would defeat the identification of the caller in the call center. Thus, to date, it is not realistic to associate the identity of a caller with a vote in a voting or polling system.

SUMMARY OF THE INVENTION

The present invention addresses the deficiencies of the art in respect to polling and voting systems and provides a novel and non-obvious method, system and apparatus for vote processing in concert with a PSTN. In accordance with the present invention, a method for vote processing in a PSTN can include receiving a vote from a calling party over the PSTN. Caller information for the calling party can be retrieved from the PSTN. Subsequently, the vote can be validated based upon the caller information. Finally, the vote can be processed based upon the validation. For instance, the vote can be tallied if the calling party is validated as not having previously voted. In contrast, the vote can be rejected if the calling party is determined to have previously voted.

The receiving step can include receiving at least one answer to a poll question over the PSTN. Further, the receiving step can include receiving a voice vote over the PSTN. The receiving step yet further can include the step of receiving a DTMF-based vote over the PSTN. Finally, the receiving step can include decoding a vote based upon a dialed telephone number over the PSTN. In any case, in a preferred aspect of the invention, the retrieving step can include receiving a data communications message from a name resolution adapter disposed within the PSTN and extracting an identity for the calling party from the message.

In this regard, the retrieving step can include querying a LIDB through the name resolution adapter for an address for the calling party.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for vote processing through a PSTN. In accordance with the present invention, the identity of a calling voter can be determined in the PSTN. Concurrently, a vote by the calling voter can be accepted in the voting system. Using the identity of the calling voter, the vote placed by the calling voter can be validated. For instance, it can be determined in the voting system whether the calling voter had previously voted. If the calling voter can be validated, the vote can be tallied in the voting system. Otherwise, the vote can be ignored. In this way, utilizing information stored in the PSTN, a more precise form of public voting and polling can be realized, particularly without the threat of multiple votes received from the same person.

Figure 1:
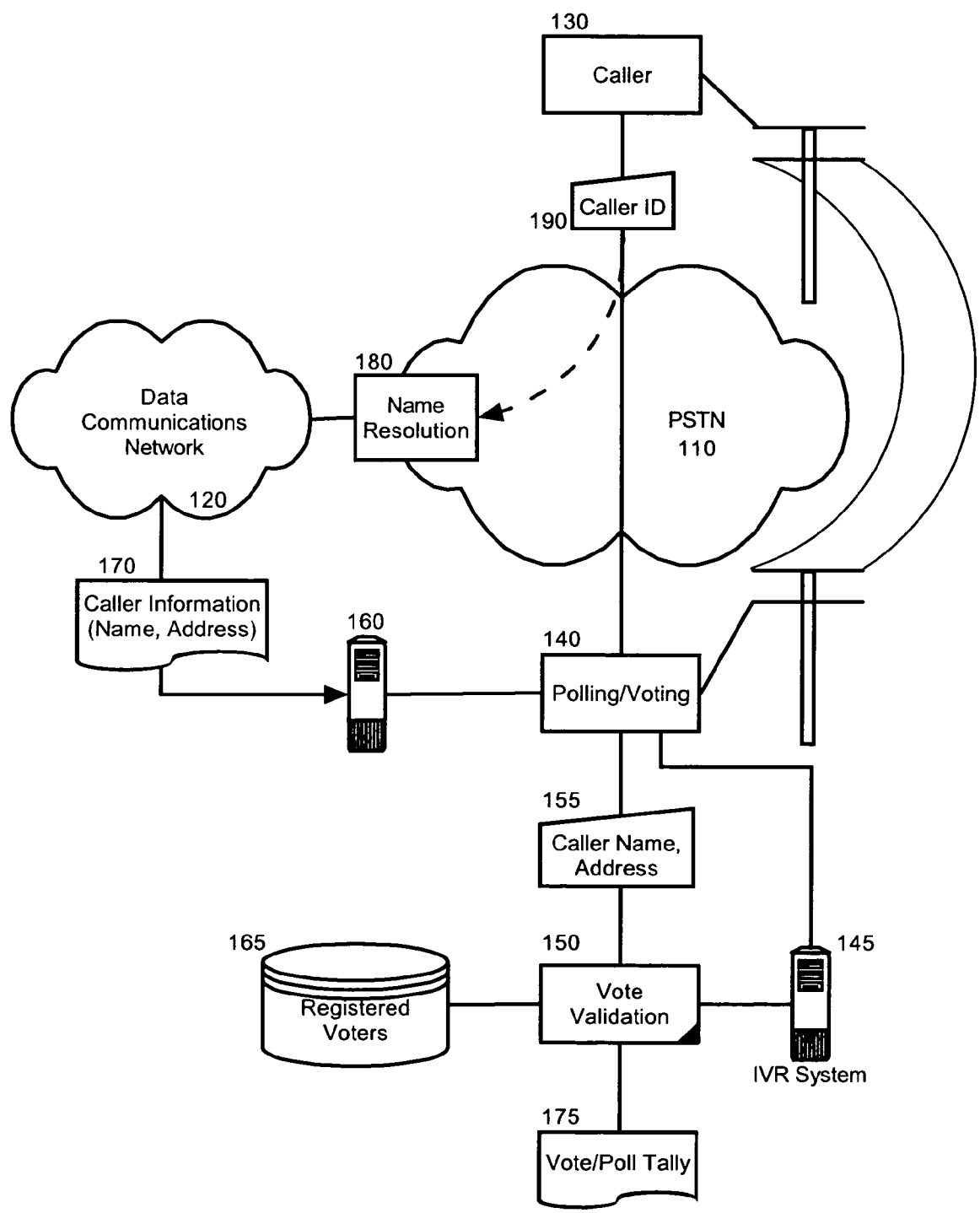
FIG. 1 is a block diagram illustrating a system, method and apparatus for vote processing in a PSTN according to the inventive arrangements.

In further illustration, FIG. 1 is a block diagram illustrating a system and method for vote processing through a PSTN according to the inventive arrangements. Specifically, a calling voter 130 can be coupled telephonically to a voting system 140 by way of the PSTN 110. The voting system 140 can be configured to process votes, including selections for polling questions, from the calling voter 130 over a telephonic linkage provided by the PSTN 110. Preferably, the voting process can be conducted audibly, the through the use of DTMF input processing through the operation of an interactive voice response system 145, or through an identification of specifically dialed telephone number or extension, although the invention is not so limited to the precise arrangement shown in FIG. 1.

The voting system 140 can include a vote validation processor 150 coupled to a data store of registered voters 165. The data store of registered voters 165 can include registered voter information useful in validating the votes by calling voters. Exemplary data can include the names of voters, addresses of voters, specific voter identification codes and the like. Using the information disposed in the data store of registered voters 165, the vote validation processor 150 can validate a calling voter 130 based upon voter data 155 for the calling voter 130. Where the calling voter 130 can be validated, the vote or votes of the calling voter 130 can be added to the vote tally 175.

In operation, as the calling voter 130 initiates the telephone call in the PSTN 110, a name resolution adapter 180 disposed within the PSTN 110 can capture caller identifying data 190 for the telephone used by the calling voter 130 in order to identify the calling voter 130. Using the caller identifying data 190, the name resolution adapter 180 can produce specific identification data for the calling voter 130, for instance a name, address, phone number, credit card number, or account number, to name a few. In this regard, the name resolution adapter 180 can query one or more databases disposed within the PSTN 110, including a LIDB, to obtain the specific identification data based upon the caller identifying data 190.

When the specific identification data has been acquired, the specific information can be encapsulated in a caller information message 170 and provided to an enterprise application 160 associated with the voting system 140 over the data communications network 120. Concurrently, the call between the calling voter 130 and the voting system 140 can be established over the PSTN 110 and one or more votes or selections can be received in the voting system 140. Importantly, using the caller information 170, the voter data 155 can be determined and provided to the vote validation processor 150. The vote validation processor 150 in turn can validate the vote or votes received by the calling voter 130 using the information stored in the data store of registered voters 165 to determine whether to add the vote or votes to the vote tally 175.

Figure 2:
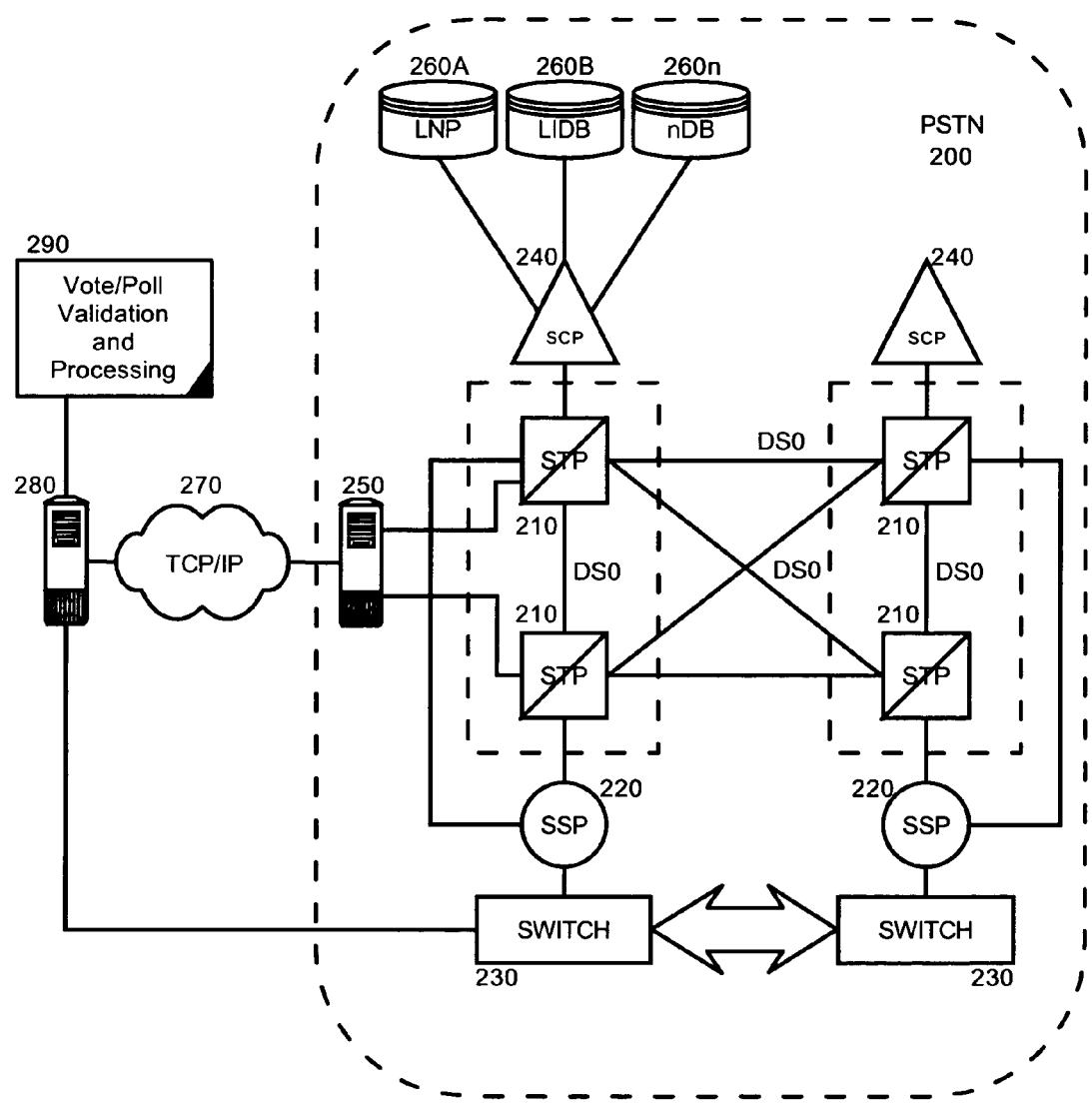
FIG. 2 is a schematic illustration of a system for vote processing using caller identities acquired within the PSTN; and, FIG. 3 is a flow chart illustrating a process for vote processing in the system of FIG. 2.

To further illustrate the preferred embodiments of the present invention, FIG. 2 is a schematic illustration of a system for vote processing using caller identities acquired within the PSTN. As shown in FIG. 2, a system for providing automatic call completion in a directory assistance system utilizing billing data computed from location information acquired within the PSTN can include one or more telephonic switches 230 coupled to one another within a PSTN 200. Each of the switches 230 can be communicatively linked to a service switching point (SSP) 220 coupled to an out-of-band signaling network comprised of a multiplicity of signal transfer points (STP) 210. Each STP 210 can be cross-connected to other ones of the STPs 210 in the PSTN so as to form an inter-network of switched communications links to support out-of-band signaling as is well-known in the art.

One or more switchless nodes each referred to as an SCP 240 can be communicatively linked to the out-of-band signaling network via one of the STPs 210 as is well-known in the art and embodied within the SS7 signaling network. The SCP 240 can be coupled to one or more databases 260A, 260B, 260n which can be configured to store invariant data such as the name, address and billing information for callers. For example, the databases 260A, 260B, 260n can include a local number portability (LNP) database, a LIDB, or any other such database which can be accessed within an SCP 240.

Notably, as is well-known in the art, the information stored within the databases 260A, 260B, 260n can be stored in amorphous records in nothing more than a flat file database, an object database or a relational database. In any event, through the communicative linkages between the SCP 240, the STP 210 and the databases 260A, 260B, 260n, transaction capabilities application part (TCAP) messages can be processed in the SCP 240 to access the invariant data in the databases 260A, 260B, 260n. In this way, calls processed through the switch 230 can access logic in the SCP 240 and data in the databases 260A, 260B, 260n through the SSP 220.

Notably, a name resolution adapter 250 can be coupled to the out-of-band network comprised of inter-connected STPs 210 to access data and logic through the SCP 240 through an exchange of messages such as TCAP messages. The name resolution adapter 250 can include a gateway node 250 having both an interface to the PSTN 200 and also an interface to a data communications network 270 such as an Internet Protocol driven network. In this way, data received through the PSTN 200, and more particularly from accessing the databases 260A, 260B, 260n in the PSTN 200 can be passed within IP packets to an enterprise application 280 over the data communications network 270. Also, as the enterprise application 280 can be coupled to a switch 230 within the PSTN 200 through an associated adapter, data disposed within the databases 260A, 260B, 260n regarding an incoming call can be processed within the enterprise application 280.

In operation, the name resolution adapter 250 can monitor calls placed to a switch 230 to which the enterprise application 280 has been coupled. As calls are received in the switch 230, the name resolution adapter 250 can receive respective TCAP messages from the STP 210 coupled to the switch 230. Using the TCAP messages, the name resolution adapter 250 can create additional TCAP messages to query the LIDB 260B to identify the callers. For each TCAP message querying the LIDB 260B, the LIDB 260B can return the identity of the caller, for instance the caller's name, or other identification such as caller's address. Once the name resolution adapter 250 has received the identity of the caller from the LIDB 260B, the name resolution adapter 250 can transmit the identity to the enterprise application 280 over the data communications network 270. The enterprise application 280 subsequently can correlate the caller identity received from the name resolution adapter 250 with a corresponding call received through the switch 230.

In a preferred aspect of the present invention, vote validation and processing logic 290 can be coupled to the enterprise application 280. The vote validation and processing logic 290 can be configured to validate telephonically received votes based upon calling voter information disposed within the identity information provided by the name resolution adapter 250. Using the acquired calling voter information, the vote validation and processing logic 290 can determine whether the calling voter had previously voted, whether the votes placed previously by the calling voter have changed, whether the calling voter had previously selected or provided a specific vote for a specific voting question, and other such similar voting pertinent considerations.

Figure 3:
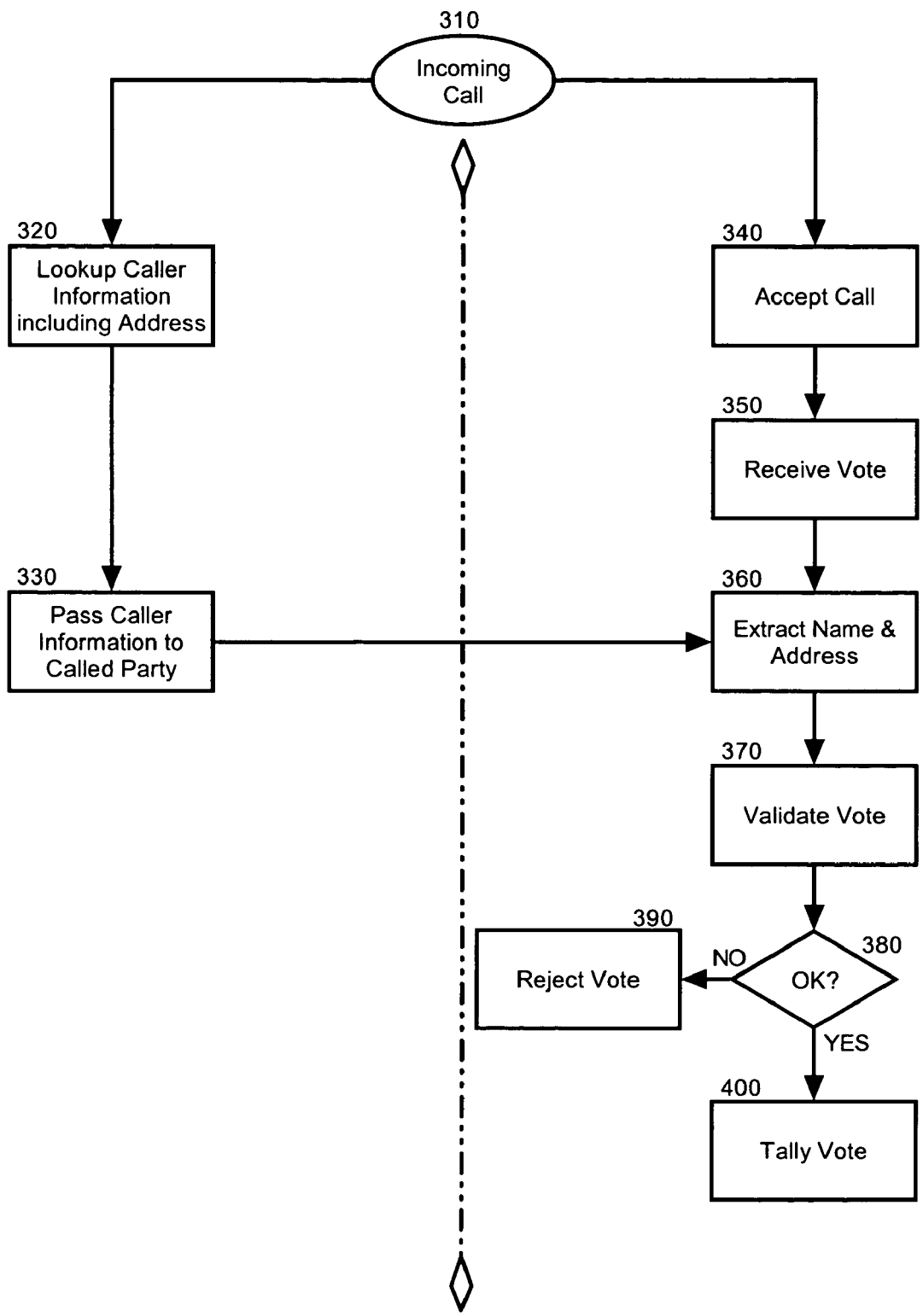

In further illustration, FIG. 3 is a flow chart illustrating a process for vote validation and processing in the system of FIG. 2. As shown in FIG. 3, beginning in block 310, an incoming call can be detected in the PSTN and processed in the vote registration and validation system. In this regard, the incoming call can be processed in a switch in the PSTN in block 320 concurrently with the connection of the incoming call to the called party in block 340. More particularly, in block 320, caller information, including the address of the caller, can be retrieved from a database disposed within the PSTN, for instance a communicatively coupled LIDB. Subsequently, in block 330, the retrieved caller information can be forwarded to the enterprise system associated with the vote registration and validation system.

Within the vote registration and validation system in block 350, one or more votes or vote question selections can be received. Concurrently, in block 360 the caller information received from the PSTN can be parsed to extract the identity of the calling party. In block 370, using the caller identity the received votes can be validated. For example, it can be determined whether the calling voter already has submitted votes for the particularly question, whether the received votes differ from previously provided votes, to name a few. In decision block 380, if the vote or votes can be validated, in block 400 the vote or votes can be tallied. Otherwise, in block 390 the vote or votes can be rejected.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A vote processing method for use in a public switched telephone network (PSTN), the method comprising the steps of:

establishing a telephonic link between a calling party and a vote processing system disposed externally to the PSTN, each coupled to different portions of the PSTN;

receiving a vote from said calling party over said telephonic link through the PSTN;

retrieving from within a switch in the PSTN over a data communications link originating in the switch, terminating in the vote processing system, and existing separately from said telephone link, caller information for said calling party;

validating said vote based upon said caller information; and, processing said vote based upon said validation.

2. The method of claim 1, wherein said receiving step comprises the step of receiving at least one answer to a poll question over the PSTN.

3. The method of claim 1, wherein said receiving step comprises the step of receiving a voice vote over the PSTN.

4. The method of claim 1, wherein said receiving step comprises the step of receiving a DTMF-based vote over the PSTN.

5. The method of claim 1, wherein said receiving step comprises the step of decoding a vote based upon a dialed telephone number over the PSTN.

6. The method of claim 1, wherein said retrieving step comprises the steps of:
   receiving a data communications message from a name resolution adapter disposed within said switch in the PSTN; and,
   extracting an identity for said calling party from said message.

7. The method of claim 1, wherein said retrieving step comprises the steps of querying a line item database (LIDB) from a name resolution adapter disposed in said switch in the PSTN for an address for said calling party.

8. The method of claim 1, wherein said processing step comprises the steps of:
   tallying said vote if said calling party is validated as not having previously voted; and,
   rejecting said vote if said calling party is determined to have previously voted.

9. A vote processing system in a public switched telephone network (PSTN), the system comprising:
   a telephone subscriber database disposed in a switch in the PSTN;
   a name resolution adapter disposed in the PSTN and coupled to said telephone subscriber database; and,
   a vote processing and validation system disposed externally to the PSTN and communicatively linked to said name resolution adapter over a data communications network through a data communications link originating in the switch and terminating in the vote processing and validation system, the link existing separately from telephone links established between calling parties and the vote processing and validation system.

10. The system of claim 9, wherein said telephone subscriber database is a line item database (LIDB).

11. The system of claim 9, further comprising an interactive voice response system disposed in said vote processing and validation system and configured for interaction with calling parties.

12. A machine readable storage having stored thereon a computer program for vote processing in a public switched telephone network (PSTN), the computer program comprising a routine set of instructions which when executed by a machine cause the machine to perform the steps of:
   establishing a telephonic link between a calling party and a vote processing system disposed externally to the PSTN, each coupled to a different portion of the PSTN;
   receiving a vote from said calling party over said telephonic link through the PSTN;
   retrieving from within a switch in the PSTN over a data communications link originating in the switch, terminating in the vote processing system, and existing separately from said telephone link, caller information for said calling party;
   validating said vote based upon said caller information; and,
   processing said vote based upon said validation.

13. The machine readable storage of claim 12, wherein said receiving step comprises the step of receiving at least one answer to a poll question over the PSTN.

14. The machine readable storage of claim 12, wherein said receiving step comprises the step of receiving a voice vote over the PSTN.

15. The machine readable storage of claim 12, wherein said receiving step comprises the step of receiving a DTMF-based vote over the PSTN.

16. The machine readable storage of claim 12, wherein said receiving step comprises the step of decoding a vote based upon a dialed telephone number over the PSTN.

17. The machine readable storage of claim 12, wherein said retrieving step comprises the steps of:
   receiving a data communications message from a name resolution adapter disposed within said switch in the PSTN; and,
   extracting an identity for said calling party from said message.

18. The machine readable storage of claim 12, wherein said retrieving step comprises the steps of querying a line item database (LIDB) from a name resolution adapter disposed in said switch in the PSTN for an address for said calling party.

19. The machine readable storage of claim 12, wherein said processing step comprises the steps of:
   tallying said vote if said calling party is validated as not having previously voted; and,
   rejecting said vote if said calling party is determined to have previously voted.

* * * * *